No. 805,642. PATENTED NOV. 28, 1905.
J. GEERS, W. MEHRLE & J. WIEMKES.
CEMENT STONE MACHINE.
APPLICATION FILED JUNE 7, 1905.
5 SHEETS—SHEET 1.
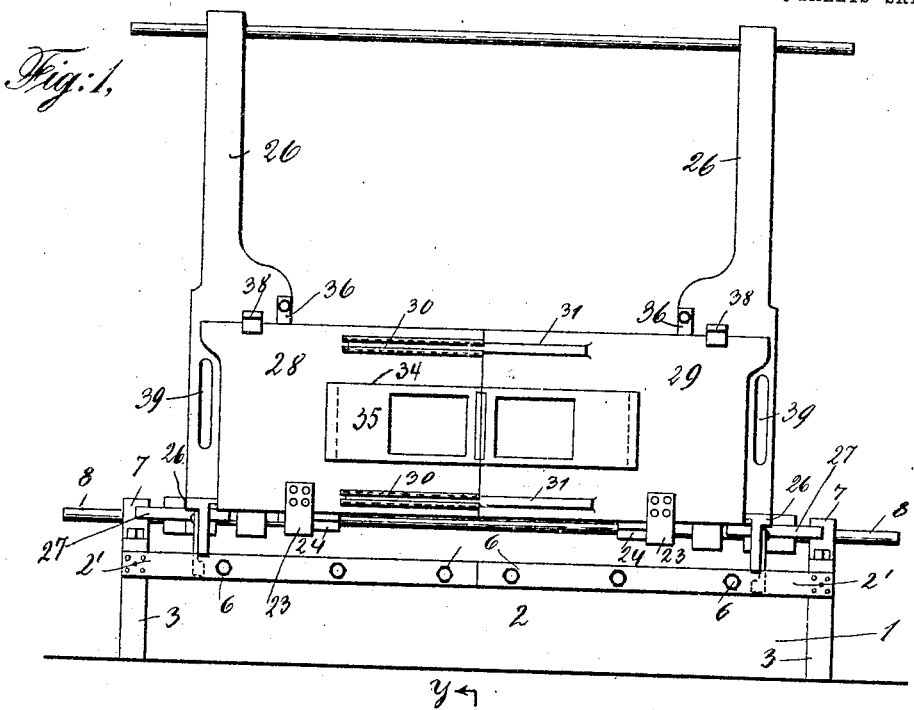
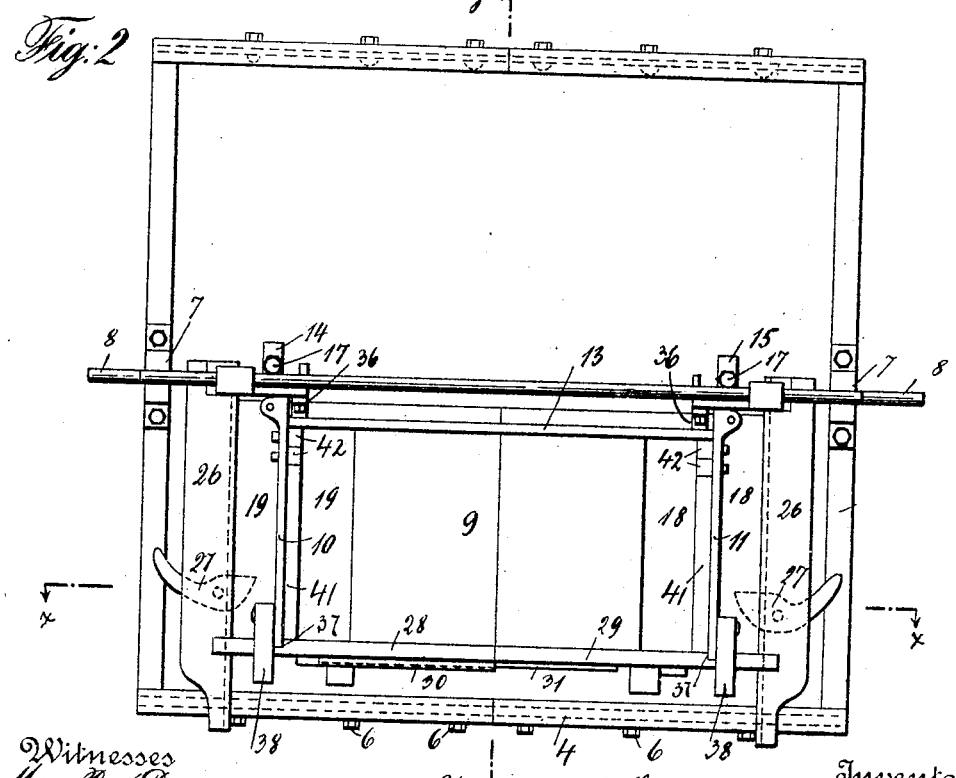

No. 805,642. PATENTED NOV. 28, 1905.
J. GEERS, W. MEHRLE & J. WIEMKES.
CEMENT STONE MACHINE.
APPLICATION FILED JUNE 7, 1905.

5 SHEETS—SHEET 3.

No. 805,642. PATENTED NOV. 28, 1905.
J. GEERS, W. MEHRLE & J. WIEMKES.
CEMENT STONE MACHINE.
APPLICATION FILED JUNE 7, 1905.
5 SHEETS—SHEET 4.
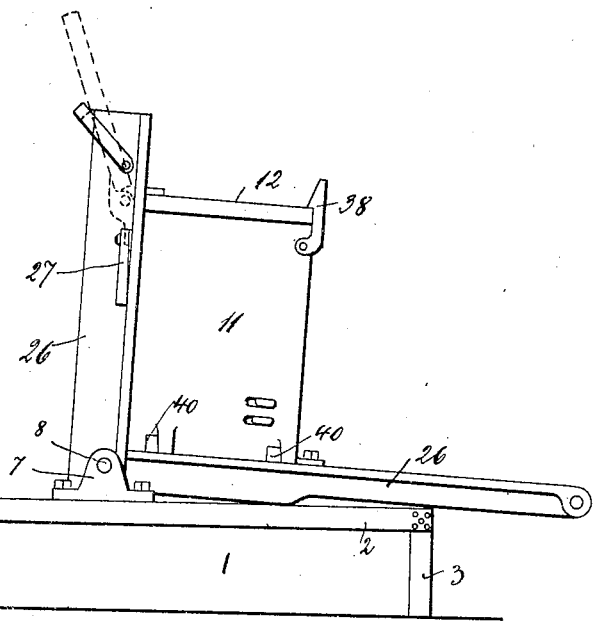
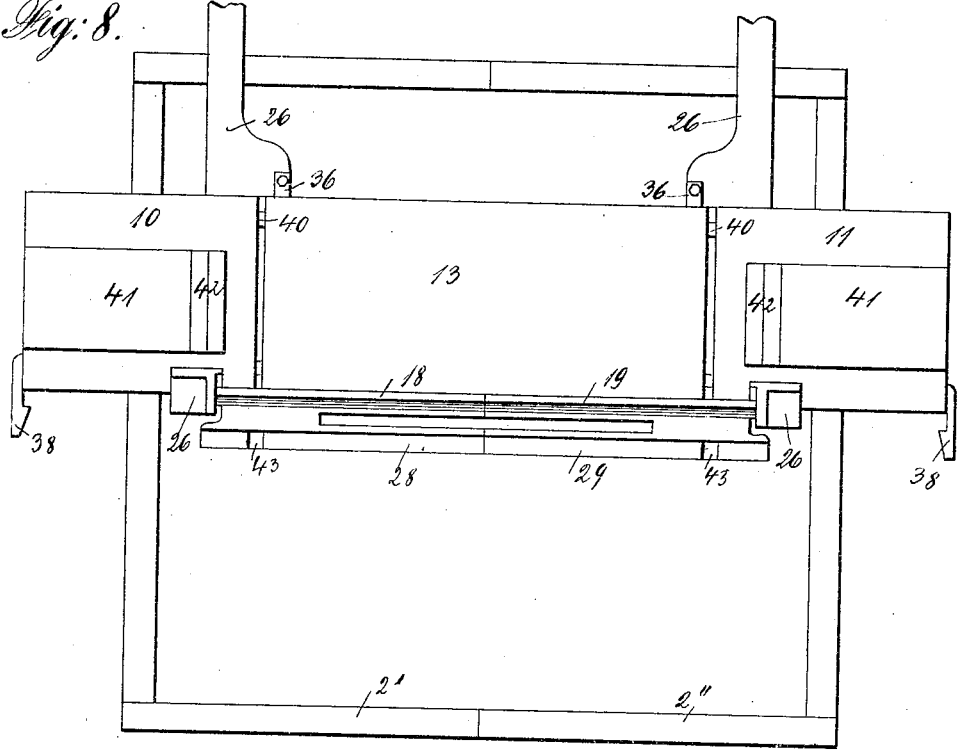

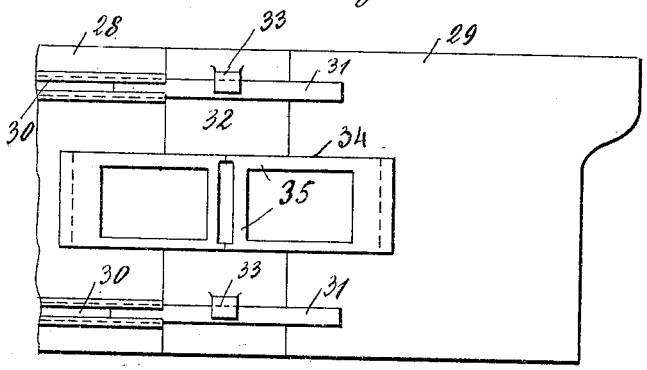
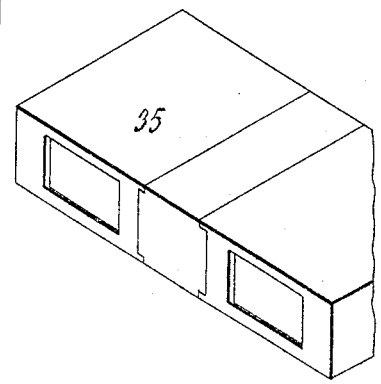
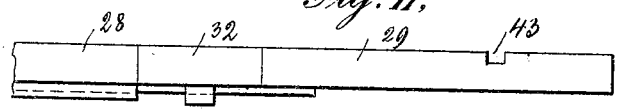
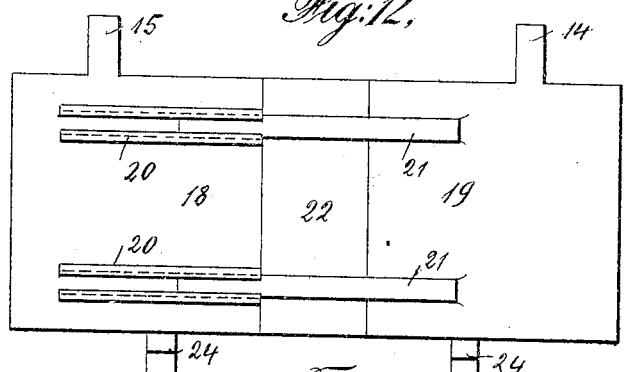
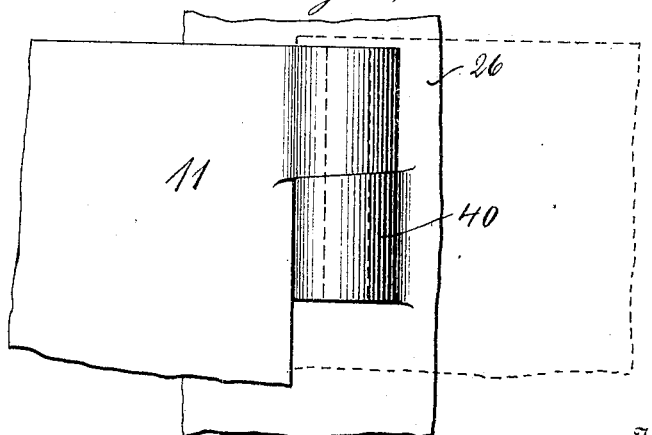

UNITED STATES PATENT OFFICE.

JOE GEERS AND WILLIAM MEHRLE, OF JERSEY CITY HEIGHTS, AND JOHANN WIEMKES, OF HOBOKEN, NEW JERSEY.

CEMENT-STONE MACHINE.

No. 805,642.  Specification of Letters Patent.  Patented Nov. 28, 1905.

Application filed June 7, 1905. Serial No. 264,149.

*To all whom it may concern:*

Be it known that we, JOE GEERS, a citizen of the United States, and WILLIAM MEHRLE, a subject of the German Emperor, both residing at Jersey City Heights, and JOHANN WIEMKES, a citizen of the United States, residing at Hoboken, in the county of Hudson, State of New Jersey, have invented certain new and useful Improvements in Cement-Stone Machines, of which the following is a specification.

The present invention relates to a cement-stone machine, and particularly to some improvements thereon, the main object of which is to render the machine extendible, so as to permit the manufacture of cement stones of various sizes.

With cement-stone machines hitherto used stones of a single size only can be produced. The manufacture of cement stones of different sizes requires always a separate mold, and the machines are therefore expensive. A further drawback with the hitherto-used cement-stone machines—as, for instance, with the so-called "Hercules" cement-stone machine—is that the mold is supported upon a central part of the shaft, which is of a considerable length and is borne at its ends in brackets arranged upon a base-frame. The tamping of the cement causes a vibration of the shaft, which renders the work difficult and ineffective. To remove these drawbacks, we have arranged a cement-stone machine, which with all its parts can be adjusted to suit any desired variation in the sizes of the stones to be produced and which is mounted upon a base, so that with any adjustment the support of the mold will not be in the center of the base-shaft, but at the ends thereof, whereby the thrust caused by the tamping of the cement will be received directly at the ends of the shaft, thus preventing the vibration of the latter.

In order to make our invention more clear, the same is illustrated in the accompanying drawings, in which similar reference-numerals denote corresponding parts, and in which—

Figure 3:
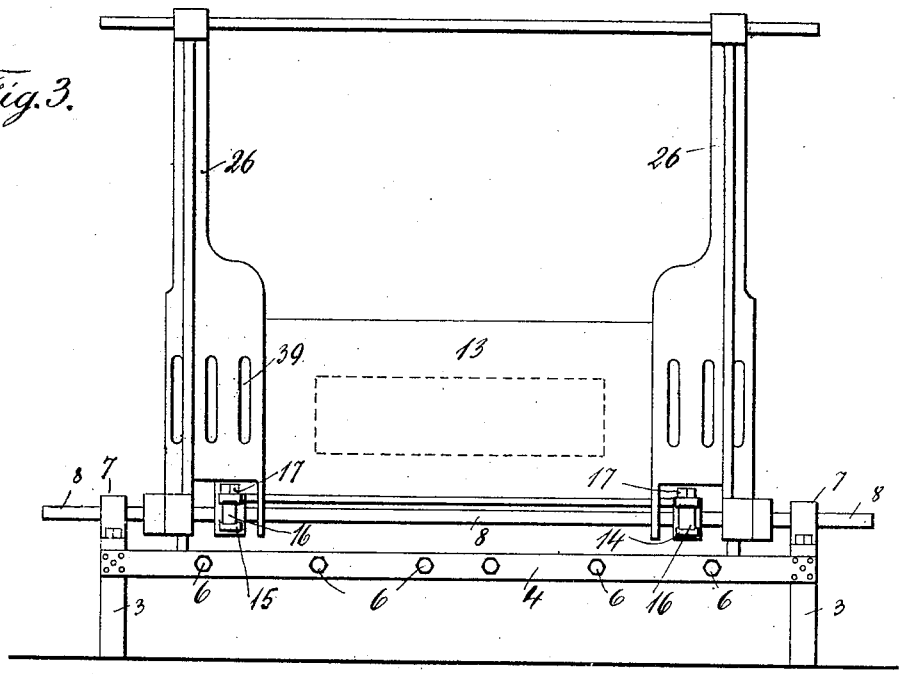
Figure 4:
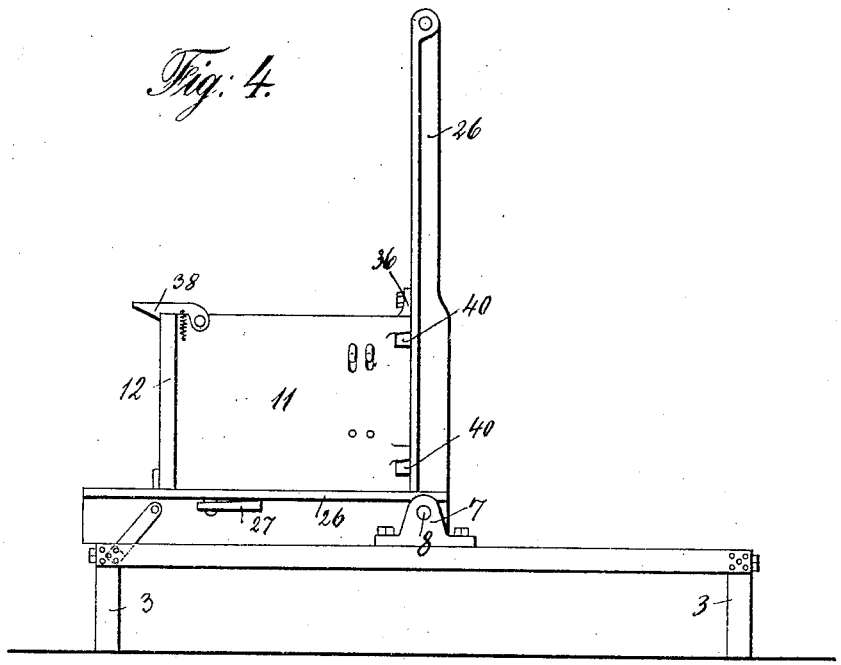
Figure 5:
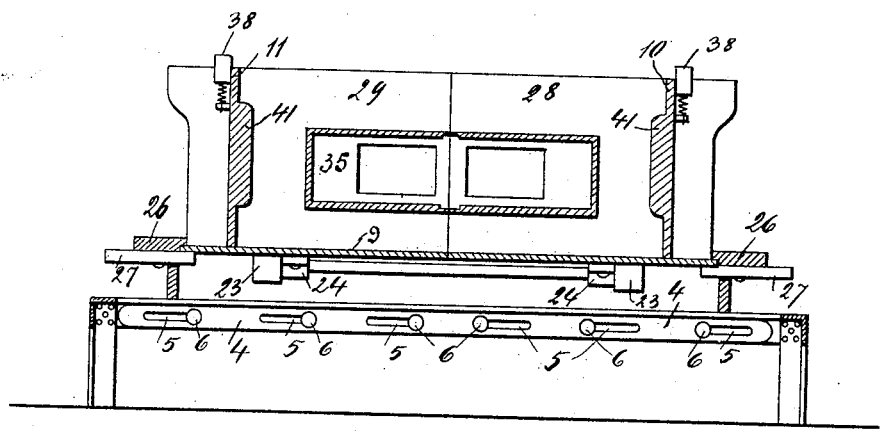
Figure 6:
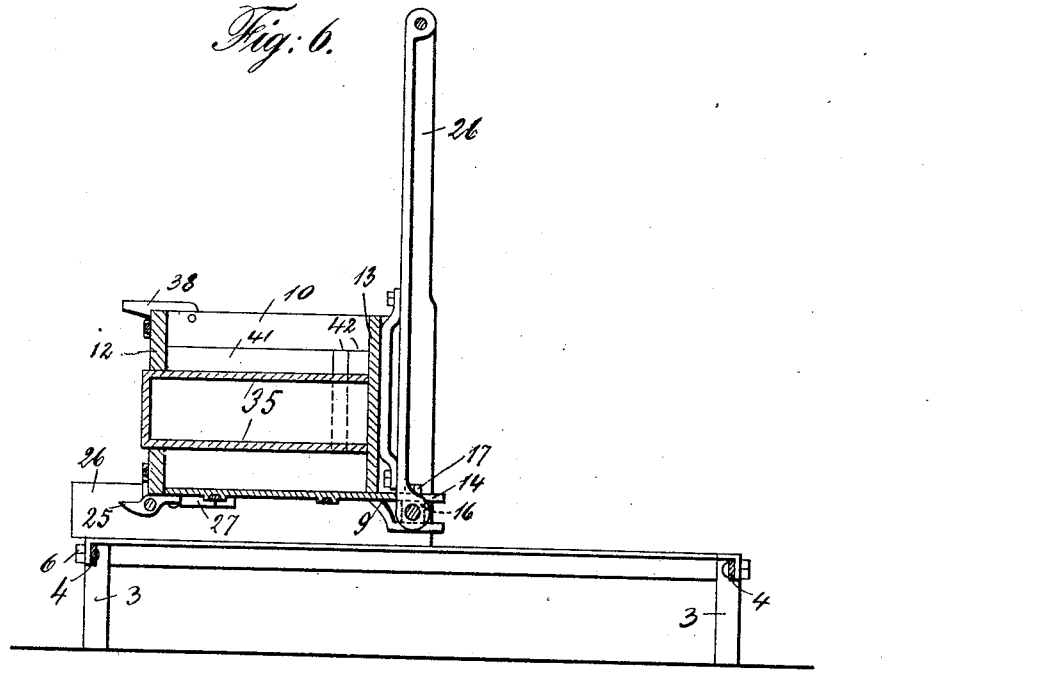

Figure 1 is a front elevation of the machine, showing all parts in the position ready for work. Fig. 2 is a plan view thereof. Fig. 3 is a rear view thereof. Fig. 4 is a side elevation thereof. Fig. 5 is a longitudinal section through line $x\ x$ of Fig. 2, and Fig. 6 is a cross-section through line $y\ y$ of Fig. 1. Fig. 7 is a side elevation of the machine, showing the mold in tilted position. Fig. 8 is a top view of the machine, showing the mold tilted and opened and in a position ready for the removal of the finished cement stone. Figs. 9, 10, 11, 12, and 13 are details of this machine.

With reference to the drawings, 1 is the base, which consists of a sectional frame 2, supported upon legs 3. The two sections 2' 2'' have the object to permit any desired extension of the frame. Bars 4 4 of a suitable length and adapted to extend longitudinally of the frame and fit upon the inner front and rear surfaces of its sections are arranged and provided with longitudinal slots 5, the length of which corresponds with the largest extension of the frame desired. Applied to the frame are studs 6, which are adapted to project from the front and rear surfaces thereof through the slots 5 of the bars 4 4 and which are threaded at their inner ends to receive screw-nuts. The latter serve to secure the position of the sections to each other after the same have been adjusted for a certain size. When the nuts are slackened, the sections can be moved toward or away from each other and adjusted in the proper position, the studs being allowed to slide in the slots.

Projecting from the upper surface of the side edges of the sectional frame 2 are brackets 7 7, in which a shaft 8, extending transversally over the two sections, is revolubly mounted. This shaft is of a sufficient length so as to allow an extension of the base-frame to any desired extent. The shaft 8 carries the molding-machine proper, which is mounted thereon in such a manner that it is capable of being swung forward and backward. Substantially, the machine is composed of the well-known parts, as there are the mold, the pallet, the core, &c. The machines hitherto used are of such a construction that they allow the manufacture of stones of a single size only. In our arrangement all the substantial parts are made extendible.

The mold consists of a face-plate 9, upon which the cement stone is formed, side walls, or rather doors, 10 11, and a core wall or door 12. At its rear the mold is adapted to receive the so-called "pallet" 13. These parts are not rigidly connected with each other, but, moreover, form separate pieces that can be brought in such a position and locked to each other as to form the molding-box. In order to allow the increase of the height of the cement stones, the face-plate is made adjustable transversally to the shaft. For this purpose the face-plate 9 is provided at its rear with bifurcated arms 14 15, which embrace bearing-boxes 16, loosely mounted upon the shaft. These arms are allowed to slide forward and backward over the bearing-boxes, which will be guided therein, and are allowed to turn upon the shaft. Screw-bolts 17, working in the bifurcated arms and projecting against the boxes, serve for the adjustment of the face-plate in proper position. This construction allows a swinging movement of the face-plate around the shaft 8 and at the same time a transversal displacement thereof to the shaft. Thus according to the height of the stones to be formed the face-plate upon which the stone is formed can after slackening the adjusting-screws 17 be moved transversally to the shaft, and thus changed in its width. In order to also allow of an extension of the plate 9 in longitudinal direction when stones of a larger width are to be formed, we cut the face-plate in halves 18 19 transversally to the shaft and provide one of the sections with longitudinal dovetailed grooves 20 20 and the other section with correspondingly shaped-outwardly-projecting bars 21 21, the latter being adapted to slide within the said groove when the sections 18 19 are being moved in either direction. Additional plates 22 of various sizes are arranged to fit in the free space formed between the sections 18 19 when the latter have been extended. Hinged to the front edge of the bottom plate is the front wall or door 12, the hinge-joints 23 24 permitting the swinging of the said front wall forward and backward. The hinges 24, attached to the face-plate 9, may be provided with outwardly-projecting noses 25, which when the front wall is swung open will serve to support the latter in open position and prevent it from turning over altogether. L-arms 26 26 are arranged at both sides of the mold, with their lower and rear ends loosely mounted upon the shaft 8, so as to be capable of swinging around the latter. The front ends of these L-arms rest upon the front edge of the base-frame. To the bottom of the horizontally and forwardly projecting parts of the L-arms hand-levers 27 27 are pivoted, which when the face-plate 9 is in working position with their inner ends are adapted to support the plate 9. By turning the hand-levers in a certain direction their inner ends will release the face-plate 9. The front wall or door is also made extendible in longitudinal direction in a similar way as the face-plate 9. The same is divided transversally in two sections 28 29, (see Fig. 9,) of which one section has longitudinal dovetailed grooves 30 30 and the other correspondingly-shaped outwardly-projecting bars 31 31, adapted to engage the said grooves and slide therein when the sections are moved either way. Additional pieces 32 in various sizes may serve to fill in the free spaces between the extended sections. The pieces 32 may be provided with suitable detaining means, as hooked-shaped noses 33 or the like, which when the plates 32 are inserted will engage the bars 31 and be held in proper position. The sections 28 29 are cut out to form an opening 34 for the insertion of the core 35. The latter may be also made extendible either in similar manner as the face-plate and front door by making it of two sections which may be connected with each other by dovetailed grooves in one section and corresponding bars in the other and using additional pieces to fill in the free spaces or in any other suitable manner. The upper ends of the L-arms bear a rod, which serves as a handle for the manipulation of the machine while in use. Toward their lower ends the L-arms 26 26 are widened and provided at their inner edges with forwardly-projecting longitudinal ribs 36, serving as a support for the pallet 13. Hinged to these arms are the side doors 10 11. To secure the side walls and front walls in working position, the front wall 12 is provided at its inner surface and the ends thereof with grooves 37, adapted to engage the front edges of the side walls, so as to prevent them from swinging laterally during the work. These side doors 10 11 are provided at their upper ends with forwardly-projecting spring-actuated catches 38, pivoted thereto, which will engage the upper edge of the front door 12, and thus lock the latter in working position. Openings or slots 39 may be provided in the upright parts of the L-arms 26, through which a suitable tool can be introduced into the closed mold to clean the latter.

In order to produce a stone with perfectly smooth or clean surfaces, the parts forming the mold must tightly close upon each other. For this purpose the hand-levers 27 27 are cam-shaped at their inner ends, as seen from Fig. 4, whereby these ends will raise and press the face-plate closer to the side and front doors as they are being turned inward. To prevent the obstruction of the side doors by cement particles, we make the hinge-surfaces of the hinges 40 of the side doors also cam-shaped, (see Figs. 4, 13,) so that by swinging the doors open the latter will be lifted from above the surface of the face-plate and the surface of the supporting parts of the L-arms 26.

The L-corners are produced as with the hitherto-used machines by the inwardly-projecting parts 41 of the side doors 10 11. When the mold is to be extended for the production of larger stones, additional pieces 42 must be secured to the side doors alongside the parts 41. The attachment of said additional pieces may be attained in any suitable way.

The pallet may be made of wood or metal. We prefer to use wood, since the cement is tamped on the face-plate 9 and not on the pallet. When the parts are in working position, the pallet abuts against the ribs 36 of the L-arms 26, and upon the tilting over of the mold the same rests upon the said ribs and supports the finished stone.

For the production of various designs upon the face of the stones correspondingly-shaped design-plates may be used to rest on the face-plate.

After the machine has been adjusted for a certain size of stones and the parts connected the mold is filled with cement, which is tamped until level with the bottom edge of the opening 34 in the front door. Thereupon the core 35 is inserted through this opening, so as to rest upon the cement, and again cement is placed into the mold and tamped therein until the stone is finished. The mold is then tilted rearward by turning down the L-arms 26 level with the base-frame, in which position the ends of the L-arms which bear the rod will rest upon the base-frame. The side doors 10, 11 and the core-door 12 are then swung open, whereby the finished stone resting upon the pallet will be exposed to be removed for further treatment.

Whether extended or contracted, the parts are mounted upon the shaft in such a manner that the force exercised in tamping the cement is not taken up by the central part of the shaft, but is always transmitted to the bearing portions thereof, whereby the machine is rendered stable and a vibration of the shaft will be prevented.

It will be understood that some changes in the various parts may be made without departing from the spirit of our invention.

What we claim, and desire to secure by Letters Patent, is—

1. In a cement-stone machine, the combination of a transversally-extendible frame, a shaft revolubly borne therein, a mold extendibly mounted upon the latter, the said mold having a sectional core-door, side doors, and a sectional face-plate, the sections of the core-door and the face-plate being extendibly connected with each other, adjustable bearings at the rear of the face-plate, said bearings being loosely mounted upon the shaft and allowing a swinging movement of the face-plate and a displacement thereof transversally to the shaft, the core-door being hinged to the face-plate, extension means for the core-door and the face-plate, substantially and for the purpose as specified.

2. A cement-stone machine comprising a transversally-extendible base-frame, a shaft revolubly borne therein and extending longitudinally thereof, L-arms loosely borne upon the shaft adjacent to the bearings thereof and capable of a longitudinal displacement thereon, a mold composed of side doors hinged to said L-arms to swing horizontally, a face-plate loosely borne upon the shaft to swing vertically, the bearings of said face-plate being adjustable transversally to the shaft, a core-door hinged to the face-plate and capable of swinging vertically, the face-plate and core-door being extendible in longitudinal direction, an opening in the core-door, a core to be inserted through said opening, means applied to the L-arms to support the face-plate in working position, means for locking the side doors and the core-door with each other in working position and a pallet adapted to rest at the back of the mold against the L-arms, substantially and for the purpose as specified.

In testimony whereof we affix our signatures in presence of two witnesses.

JOE GEERS.
WILLIAM MEHRLE.
JOHANN WIEMKES.

Witnesses:
CHARLES SCHLOEMANN,
MAX D. ORDMANN.